United States Patent [19]
Cassonnet

[11] 3,956,735
[45] May 11, 1976

[54] SEQUENTIAL MICRO-INSTRUCTION SELECTION APPARATUS

[75] Inventor: Jean-Claude Marcel Cassonnet, Conflans-St.-Honorine, France

[73] Assignee: Compagnie Honeywell Bull (Societe Anonyme), Paris, France

[22] Filed: Dec. 14, 1973

[21] Appl. No.: 424,708

[30] Foreign Application Priority Data
Dec. 14, 1972  France .............................. 72.44557

[52] U.S. Cl. ............................................. 340/172.5
[51] Int. Cl.² ........................................... G06F 9/16
[58] Field of Search ...................... 340/172.5; 445/1

[56] References Cited
UNITED STATES PATENTS

| | | |
|---|---|---|
| 3,348,211 | 10/1967 | Ghiron ............................ 340/172.5 |
| 3,696,340 | 10/1972 | Matsushita ...................... 340/172.5 |
| 3,736,563 | 5/1973 | Beckinger ........................ 340/172.5 |
| 3,736,567 | 5/1973 | Lotan ............................... 340/172.5 |

*Primary Examiner*—Harvey E. Springborn
*Attorney, Agent, or Firm*—Diller, Brown, Ramik & Wight

[57] ABSTRACT

A sequence of microinstructions contained in the memory of a computer includes different sub-sequences of microinstructions which may not only begin but also end at different microinstructions of the sequence. When a sub-sequence is called, registers store the return address as well as the address of the last line of the sub-sequence and a comparator causes the computer to resume processing from the return address when the address of the line processed becomes identical to that of the stored address of the last line of the sub-sequence.

5 Claims, 4 Drawing Figures

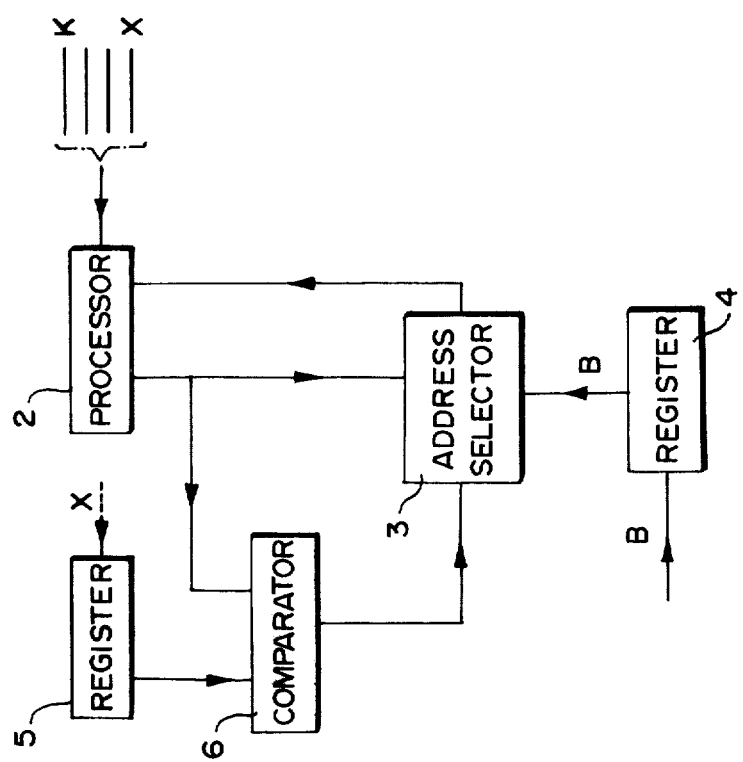
FIG.3
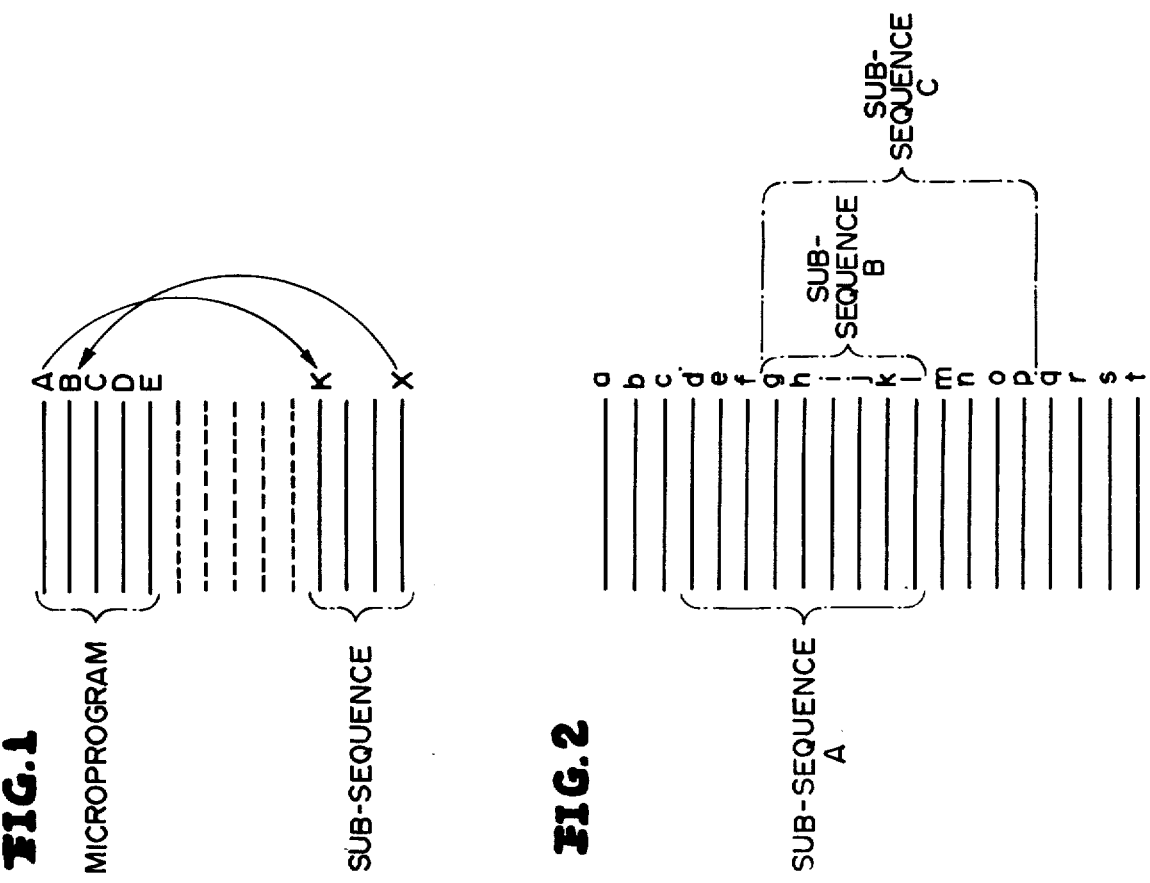
FIG.1
FIG.2

SEQUENTIAL MICRO-INSTRUCTION SELECTION APPARATUS

BACKGROUND OF THE INVENTION

In a digital computer, the execution by the central processing unit of an instruction of a machine language program is implemented in part by the execution, under control of a microprogram, of sequences of micro-instructions which are stored in one or more memories. These memories are provided for internal machine use only and are not generally available for use by the computer system user or programmer, either for data or code storage.

Micro-instructions use the basic subcommands of the machine such as single add, shift or delete type commands. Typically a specific series of micro-instructions is required to carry out a single specific machine language instruction (such as a multiply instruction) which appears in the object code (or machine language program of a computer user.

The micro-instructions thus stored in memory are ordinarily divided into functional blocks or sequences, each of which performs a particular processing operation. However, due to the use of similar processing operations by more than one sequence, certain common micro-instruction sub-sequences may appear in two or more sequences. It would therefore be advantageous to eliminate the duplication of these common sub-sequences in order to save a certain number of memory positions.

To this end, it has been proposed to insert in the microprogram, at the point where a common sub-sequence is needed a sub-sequence initiating signal (sub-sequence call) and to add to the end of the sub-sequence an end-of-sub-sequence signal which retures to the normal order of microprogram execution. The instruction calling the Sub-microprogrm call stores the memory address following its own address (i.e., the return address) in a special register. This is depicted in FIG. 1, wherein is shown a microprogram calling instruction A, which calls the sub-sequence K-X, and the end-of-sub-sequence signal at X which signal returns control to the microprogram at return address B. At the end of the sub-sequence, the end-of-sub-sequence signal returns control to the address contained in this register (i.e., the return address).

It should be noted that various sub-sequences can be formed by varying the starting address of the sub-sequence as indicated by the sub-sequence calling instruction. FIG. 2 depicts such an arrangement wherein sub-sequence A contains micro-instructions d-1, while sub-sequence B contains micro-instructions g-1. However, since the end of the sub-sequence d-1 is defined by an end-of-sub-sequence signal at location 1, it is impossible with prior art arrangements to form a sub-sequence starting at g, for example, which terminates at a location other than 1. In other words, providing a return address signal at the end of each sub-sequence in essence closes the sub-sequences at that point where the return address signal occurs.

BRIEF SUMMARY OF THE INVENTION

The present invention consists in providing a computer with the capability of calling and executing different but overlapping sub-sequences of micro-instructions selected from a continuous sequence or series of sequences stored in at least one memory. Since said this capability does not require that sub-sequences be terminated by a return address instruction, several sub-sequences may be contained within a continuous sequence of micro-instructions in overlapping or in nested fashion, even though the sub-sequences terminate at different micro-instructions. Thus, as shown in FIG. 2, under the invention a sub-sequence C may be formed comprising micro-instructions g-p.

The known method previously mentioned has the potential of saving memory space by providing for repeated use of a specific common sub-sequence of instructions stored only once in memory (somewhat analagous to a subroutine in regular programming) and it also would permit the melding in memory of two or more different sub-sequences of micro-instructions whcih contain a common set of micro-instructions provided that they end at a common point (i.e., line of micro-instruction). The present invention, however, will further permit the melding in memory of two or more sub-sequences of micro-instructions which contain a common set of micro-instructions and which may not only start but also terminate at different micro-instruction lines. The memory-saving potential provided by this feature is thus considerably advanced over prior art. In addition, the task of the microprogram designer, who typically cannot tell what the common sequences will be or what lengths they will have until after the microprograms are completed, may be considerably eased by the flexibility of this feature. The burden of restructuring the memory (e.g. consolidation of the program and consequent changes in micro-instructions) after completion of program design may be considerably lessened.

Generally, the present invention is an apparatus allowing the creation of open sub-sequences, that is sub-sequences whose position and length may be modified as a function of need. To this end, the invention involves the use of one or more memories for storing the continuous sequence of micro-instructions from which a plurality of different micro-instruction sub-sequences is to be selected, a processor for processing said different micro-instruction sub-sequences and for outputing both the address of the end of a selected sub-sequence being processed and sequentially the addresses of the micro-instructions of said selected sub-sequence being processed, a selector apparatus whereby said different sub-sequences may overlap within, and terminate at different micro-instructions of, said sequence of micro-instructions, said selector apparatus comprising an address selector connected to said sequential address outputs of the processor for controlling said processor normally to process micro-instructions of said sequence sequentially and a comparator connected to said address output corresponding to the end of said selected sub-sequence and to said address selector for controlling the latter to terminate a selected micro-instruction sub-sequence at desired micro-instruction of said sequence.

More specifically, the processor ordinarily carries out the micro-instructions in conformity with a microprogram, each instruction of which is capable of calling one sub-sequence (sub-microprogram); a first register stores the address of the following micro-instruction of the microprogram prior to initiation of the sub-sequence, the microprogram being resumed after the execution of the sub-sequence; at least one second register stores the address of the last instruction of the sub-sequence; and the comparator commands return to the stored address within the first register when the address of the micro-instruction being carried out and the address stored in the second register are identical.

The two registers are loaded by the calling micro-instruction from the microprogram prior to initiating the sub-sequence (sub-microprogram).

The addition of supplementary registers allows the sub-sequences to call other sub-sequences.

BRIEF DESCRIPTION OF THE DRAWING

FIG. 1 is a conceptual diagram, depicting microprogram A–E and a called sub-sequence K–X;

FIG. 2 is a conceptual diagram, depicting three sub-sequences in overlapping relation to each other;

FIG. 3 is a block diagram of an embodiment of the invention;

DETAILED DESCRIPTION

Figure 4:
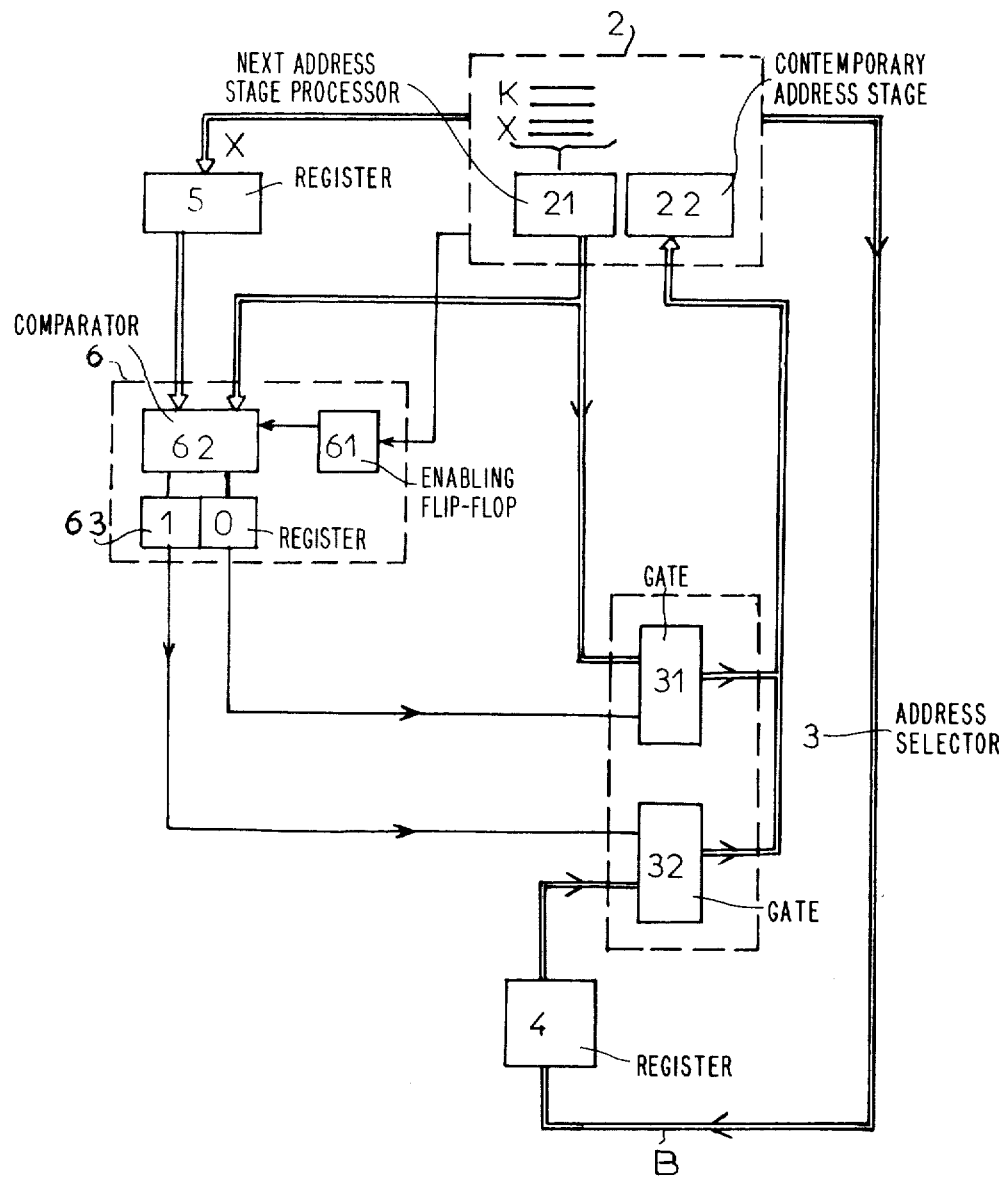
FIG. 4 is a detailed block diagram of the apparatus of the invention.

As mentioned, FIG. 1 represents a microprogram sequence A–E arrayed in a read-only memory and ordinarily carried out from top to bottom. It is to be understood that these micro-instructions allow for the calling of various sub-sequences which are arranged in functional blocks but that in conformity with the invention, the sub-sequences in a functional block may overlap into any other block.

The micro-instruction stored at address A in FIG. 1 contains a sub-sequence call instruction. This sub-microprogram may for instance be arrayed along lines K to X of the memory. The micro-instruction following A in the main or first sequence is located at line B.

The apparatus proper is depicted in FIG. 3 and comprises a microprogram processor 2, an address selector 3, a first register R1 referenced as 4, a second register R2 referenced as 5, a comparator 6 comparing the contents of register 5 with the address of the micro-instruction in the course of the operation.

Operation is as follows: the calling microprogram stores the return address in register 4, said address being B in FIG. 1, then it stores the end-of-sub-sequence address — which in the example shown is address X — in register 5. Lastly, it addresses microprocessor 2 to the begin sub-sequence address — which in the example shown is address K — by means of the address-selector 3.

The sub-sequence from K to X is normally carried out, with comparator 6 continuously comparing the address X stored in register 5 with the address of the sub-sequence instruction being carried out.

When line X is presented at micro-processor 2, it will be executed and control normally will be returned to the microprogram at location B. However, as hereinafter described, the line X can be used for branching to a further subroutine. An identity comparison in comparator 6 enables the sending of the address stored in register 4 (address B) to the processor 2; the comparison device then will be deactivated. Thereupon, the main sequence of the microprogram will unfold normally from B until there is a call for another or possibly the same, sub-sequence.

FIG. 4 is a more detailed illustrative embodiment of the apparatus. The main components already discussed above are present in FIG. 4. The microprogram processor 2, among things includes a circuit for computing addresses which, at stage 21, will provide the address following that of the micro-instruction being carried out, and at stage 22, the contemporary address, that is, the one of the micro-instruction being performed. As noted above, registers 4 and 5 receive addresses B and X when a sub-sequence is called.

Address selector 3 consists of two gates, 31 and 32 to which are applied: comparator 62 output signal and stage 21 output signal providing the next address to gate 31, and comparator 62 output signal and register 4 output signal with return address B to gate 32.

These gate outputs are connected to input of stage 22 storing the contemporary address or the address of the micro-instruction being carried out.

At the beginning of branching (beginning of performing a selected sub-sequence), the comparator 6 is enabled by the stage 61 which in practice may be a flip-flop. When the comparator subsequently registers identity (i.e., at the end of the selected sub-sequence), the comparator is disabled by the stage 61. The purpose of this is to prevent undesired branching during the normal performance of the microprogram. Comparator 62 applies a logical zero signal to register 63 if there is lack of identity between the next address and that stored in register 5, but will apply a logical one signal in the opposite case. When the comparison signal is zero, gate 31 passes the next address in the sub-sequence to register 22 after one line of micro-instructions has been carried out.

When the comparison signal is one, gate 31 remains blocked, gate 32 is open and return address B, until now stored in register 4, is passed to register 22. Processor 2 then continues the microprogram from B (i.e. from the return address).

The example described above is merely illustrative in nature and other technical means may be used to achieve the functions mentioned above, without thereby leaving the scope of the invention. The timing for such functions can be provided in the processor 2 by methods which are known per se in the art.

In the above example, the called sub-microprogram cannot be in turn the calling sub-microprogram. However such a characteristic may be achieved by adding one or more register(s) allowing storing one or more return address, while the comparator may remain in the form shown with suitable connections being provided appropriately to pass the return addresses.

What is claimed is:

1. In a computer having memory means for storing a sequence of micro-instructions from which a selected sub-sequence may be selected by a calling micro-instruction, and processor means for processing said selected sub-sequence and for outputting both the address of the end micro-instruction of a selected sub-sequence being processed and sequentially the addresses each of the micro-instructions of said selected sub-sequence as each micro-instruction is being processed, an apparatus whereby said selected sub-sequence may terminate at any micro-instruction of said sequence of micro-instructions, said apparatus comprising:

address selector means connected to said sequential address outputs of the processor means for controlling said processor means normally to process micro-instructions of said sub-sequence sequentially; and means connected to said address output corresponding to the end of said selected sub-sequence, to said sequential address outputs and to said address selector means for causing the latter to terminate a selected sub-sequence when said sequential address output coincides with said end of said selected sub-sequence.

2. In a computer as defined in claim 1 wherein the means connected to said address output includes register means for storing said address of the end of the selected sub-sequence, and comparator means connected to said register means and to said sequential address outputs of the processor means.

3. In a computer as defined in claim 2 including a second register means and wherein said address selector means is connected to said second register means and to said processor means so as to receive and store an additional address for returning control to the microprogram which called for the selection of said selected sub-sequence, and wherein said address selector means comprises gating mechanism controlled by said comparator means selectively to pass said sequential address outputs to said processor means during the processing of said selected sub-sequence and to pass said additional address to said processor means at the end of the processing of said selected sub-sequence.

4. In a computer including processor means for processing, under the control of a calling micro-instruction from a microprogram, a selected sub-sequence of micro-instructions, said selected sub-sequence being overlapping with, but having common portions which do not end at the same micro-instruction as, a second sub-sequence, the combination of:

first register means for storing an address returning to a next address of said microprogram, which next address follows the address of said calling micro-instruction which called said selected sub-sequence;

second register means for storing an address of the last micro-instruction of the selected sub-sequence; and comparator means connected to said second register means and to said processor means for comparing the output of said second register means with the address of each micro-instruction as the sub-sequence is processed by said processor means whereby completion of said selected sub-sequence is determined, said comparator means having an output for producing a signal indicating the completion of said selected sub-sequence.

5. In a computer as defined in claim 4 including address selector means connected to the output of said first register means so as to receive said next address of the microprogram and to the output of said comparator means so as to receive said signal indicating completion of said selected sub-sequence for passing said next address of the microprogram to the processor means in response to said signal indicating completion of said selected sub-sequence.

* * * * *